United States Patent [19]
Yoshimura

[11] Patent Number: 5,917,467
[45] Date of Patent: Jun. 29, 1999

[54] PC CARD SYSTEM HAVING VIDEO INPUT-OUTPUT FUNCTIONS

[75] Inventor: Yoshimasa Yoshimura, Tokyo, Japan

[73] Assignee: Mitsubishi Denki Kabushiki Kaisha, Tokyo, Japan

[21] Appl. No.: 08/663,845

[22] Filed: Jun. 14, 1996

[30]    Foreign Application Priority Data

Nov. 21, 1995  [JP]  Japan .................................. 7-302767

[51] Int. Cl.⁶ ........................................................ G09G 5/00
[52] U.S. Cl. ........................... 345/112; 345/204; 395/884; 395/885
[58] Field of Search .......................... 345/115–116, 327, 345/507, 196, 204; 395/885–892, 307–308, 282, 309, 882, 884

[56]             References Cited
              U.S. PATENT DOCUMENTS

| 5,539,658 | 7/1996 | Mc Cullough | 345/309 |
|---|---|---|---|
| 5,630,163 | 5/1997 | Fung et al. | 395/307 |
| 5,687,346 | 11/1997 | Shinohara | 711/130 |
| 5,689,732 | 11/1997 | Kondo | 395/884 |
| 5,724,529 | 3/1998 | Smith et al. | 395/309 |

*Primary Examiner*—Richard A. Hjerpe
*Assistant Examiner*—Henry N. Tran

[57]             ABSTRACT

The objective of the invention is to provide a portable information processing apparatus and a PC card for its expansion that facilitate transient and still images. A PC card system of the invention comprises a PC card capable of processing video signals and an information processing apparatus having a liquid crystal display, PC card slots, a VGA controller that converts pixel data into analog RGB signals, and an LCD controller that controls the liquid crystal display. The information processing apparatus further has an analog RGB signal lines and synchronizing signal lines between the LCD controller and the PC card slots, and a pixel data bus between the VGA controller and the PC card slots.

5 Claims, 8 Drawing Sheets

PC CARD SYSTEM HAVING VIDEO INPUT-OUTPUT FUNCTIONS

BACKGROUND OF THE INVENTION

1. Field of the Invention

The present invention relates to the technology that facilitates transient and still visual images in portable information processing systems such as a system consisting of a notebook-type personal computer and PC cards.

2. Description of the Related Art

A portable information processing apparatus such as a notebook-type personal computer usually has a built-in display monitor and PC card slots for expansion interfaces.

Figure 8:
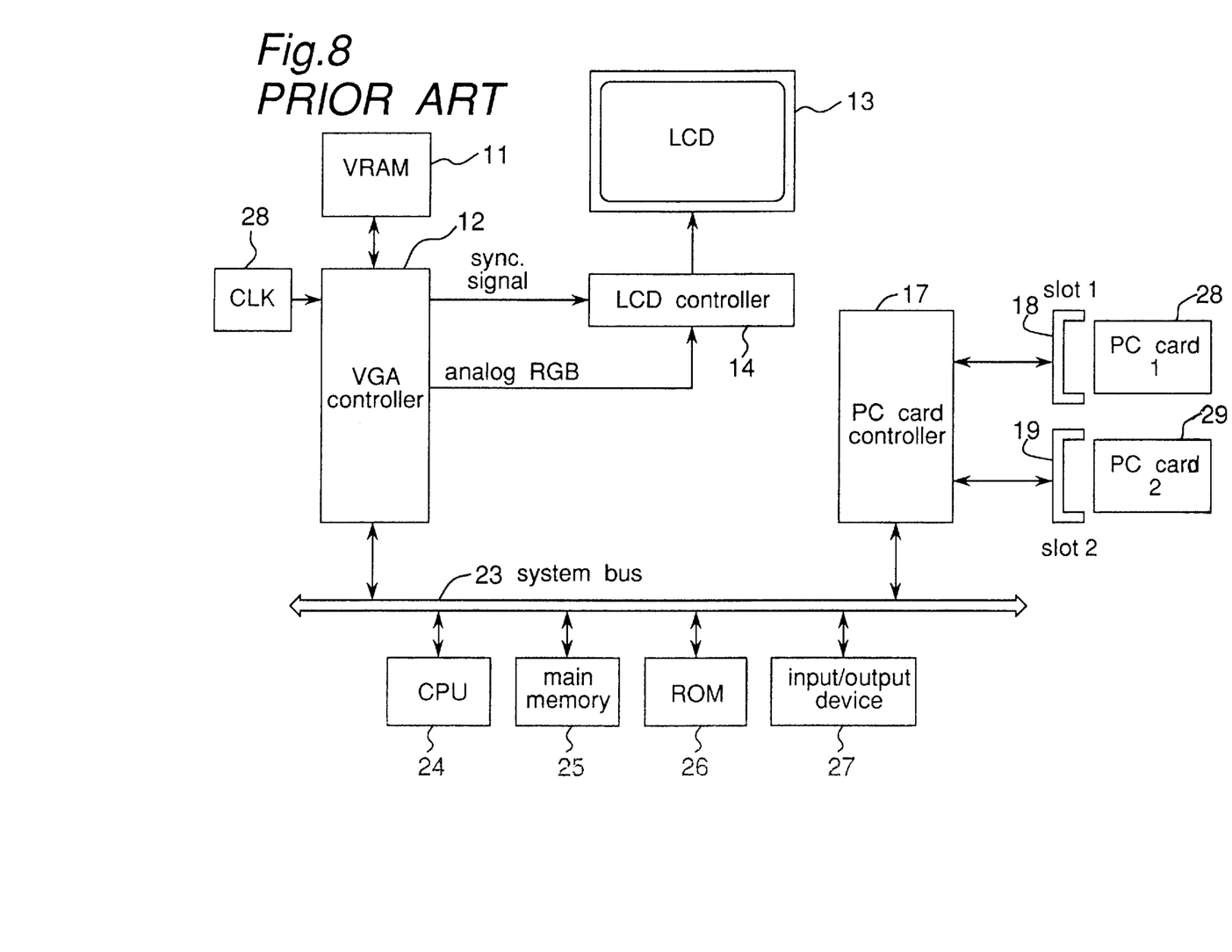
FIG. 8 is a block diagram illustrating prior portable information processing apparatus.

FIG. 8 shows a block diagram of a prior portable information processing apparatus. The prior portable information processing apparatus comprises a liquid crystal display 13, abbreviated to LCD hereafter, that displays images, a VRAM 11, called frame buffer memory hereafter, that stores image data, a synchronizing signal source 28 denoted by CLK that provides a synchronizing signal, a VGA controller 12 that converts the data stored in frame buffer memory 11 into video signals, called analog RGB signals hereafter, synchronized with the synchronizing signal provided by synchronizing signal source 28, an LCD controller 14 that controls LCD 13 based on the analog RGB signals output from VGA controller 12, PC card slots 18, 19 for installing PC cards 15, 16, and a PC card controller 17 that controls the installed PC cards 15, 16. VGA controller 12 and PC card controller 17 are connected to a system bus 23. A CPU 24, main memory 25, ROM 26, and input/output devices 27 including a key board and external storage devices are also connected to system bus 23.

Images are displayed by this information processing system as follows. Image data stored in frame buffer memory 11 is converted by VGA controller 12 into analog RGB signals synchronized with the synchronizing signal provided by synchronizing signal source 28, and the analog RGB signals are input to LCD controller 14. The analog RGB signals are converted by LCD controller 14 into a scanning signal and output into LCD 13, which displays images. Therefore, for a portable information processing apparatus to be able to display images, it is necessary to input a synchronizing signal and RGB signals to LCD controller 14. In the prior portable information processing apparatus, these signals are controlled through VGA controller 12.

As described above, prior portable information systems have no path between PC card slots 18, 19 and VGA controller 12 or LCD controller 14 for directly passing signals from one to the other. Therefore, image data provided by PC cards 15, 16 has to be processed by VGA controller 12 and LCD controller 14 through system bus 23. However, in order to realize this process, high-performance CPU 24, mass-storage main memory 25, and others are required to be practically almost impossible in a portable system. Therefore, application products that deal with transient visual images and hence require direct control over VGA controller 12 and LCD controller 14, such as TV tuners, TV telephones, video disks, have been difficult to make in the form of PC cards.

However, in the near future, it will become indispensable for a portable information system to have such functions as to receive TV programs, to exchange images, voice, and data over telephone lines, and to play back image data recorded on a video disk. Therefore, if notebook computers can easily handle visual images by installing PC cards capable of such functions, then everyone can easily use so-called multimedia in any place without large space.

SUMMARY OF THE INVENTION

The object of the present invention is therefore to provide portable information processing apparatus and its extension PC cards for facilitating transient and still visual images.

A first information processing apparatus in accordance with the present invention has a built-in monitor that displays images, frame buffer memory that stores pixel data of the images displayed on the monitor screen, a graphic controller that converts the pixel data stored in the frame buffer memory into video signals, a display controller that controls the monitor based on the video signals output from the graphic controller, and PC card slots for passing data to and from PC cards. A signal path is formed between the display controller and the PC card slots to output and input a synchronizing signal and video signals for controlling the monitor. A PC card can control the monitor by inputting and outputting a synchronizing signal and video signals through this signal path.

In a preferred second information processing apparatus in accordance with the present invention, each PC card slot has a video terminal for inputting and outputting video signals to and from the display controller and a sync terminal for inputting and outputting a synchronizing signal to and from the display controller. The signal path comprises video signal lines that connect the input/output terminal of the display controller to the video terminal of the PC card slot and synchronizing signal lines that connect the input/output terminal of the display controller to the sync terminal of the PC card slot. A synchronizing signal is passed between a PC card and the display controller through the sync terminal and synchronizing signal lines, and video signals are passed through the video terminal and video signal lines.

In a preferred third information processing apparatus in accordance with the present invention, each PC card slot of the above first and second information processing systems further has a pixel data terminal for passing pixel data between the installed PC card and the graphic controller. Further, the signal path contains a pixel data bus for connecting the input/output terminal of the graphic controller to the pixel data terminal of the PC card slot. Pixel data created by the information processing apparatus is output to the PC card through the pixel data bus and pixel data terminal by these means.

In a preferred fourth information processing apparatus in accordance with the present invention, the above first and second information processing apparatus have multiple PC card slots and have an output means that outputs video and synchronizing signals input from a PC card installed in a first PC card slot into a PC card installed in a second PC card slot.

A PC card in accordance with the present invention is a PC card to be installed in an information processing apparatus and comprises an external interface means that inputs an external signal from the outside, a signal processing means that processes the input signal to convert into video signals of a desired format, and a PC interface means that outputs the video signals obtained by the signal processing means into the information processing apparatus. The video signal input from the outside is converted into video signals of a desired format inside the PC card and output into the information processing apparatus.

A preferred second PC card in accordance with the present invention has an external interface that converts an input signal selected from an NTSC signal and an S-VHS signal into a synchronizing signal, a chroma signal, and a luminance signal, a signal processing means that converts the chroma and luminance signals output from the external interface into video signals, and a PC interface means that outputs the video signals output from the signal processing means into an information processing apparatus. The signal selected from an NTSC signal and an S-VHS signal and input to the PC card is separated to a synchronizing signal, a chroma signal, and a luminance signal. The chroma signal and the luminance signal separated by the signal processing means are converted into video signals, which are output into the information processing apparatus together with the synchronizing signal by the PC interface means.

A preferred third PC card in accordance with the present invention has an external interface means that converts an input digital RGB signal into an analog signal, a signal processing means that converts the analog signal output from the external interface means into video signals, and a PC interface means that outputs the video signals output from the signal processing means into an information processing apparatus. The external interface means extracts the synchronizing signal from an input digital RGB signal and also converts the digital RGB signal into an analog signal. The signal processing means converts the analog signal into video signals, and the PC interface means outputs the video signals into the information processing apparatus together with the synchronizing signal.

A preferred fourth PC card in accordance with the present invention has an external interface that decompresses an input compressed image data signal to convert into an analog signal, a signal processing means that converts the analog signal output from the external interface means into video signals, and a PC interface means that outputs the video signals obtained by the signal processing means into an information processing apparatus. The external interface means decompresses and converts input image data into an analog signal and a synchronizing signal to output. The signal processing means converts the analog signal into video signals, and the PC interface means outputs the video signals and the synchronizing signal into the information processing apparatus.

A preferred fifth PC card in accordance with the present invention has an external interface means that converts an input RF signal into an NTSC signal, a signal processing means that separates the NTSC signal output from the external interface means into a synchronizing signal, a chroma signal, and a luminance signal to convert them into video signals, and a PC interface means that outputs the video signals obtained by the signal processing means into an information processing apparatus. The external interface means converts an input RF signal into an NTSC signal. The signal processing means first separates the NTSC signal into a synchronizing signal, a chroma signal, and a luminance signal, then converts the chroma signal and the luminance signal into video signals. The PC interface means outputs the video signals into the information processing apparatus together with the synchronizing signal.

A preferred sixth PC card in accordance with the present invention has an external interface means that converts a signal input through communication lines into a signal appropriate for internal processing, a signal processing means that converts the signal output from the external interface means into video signals, and a PC interface means that outputs the video signals obtained by the signal processing means into an information processing apparatus. The external interface means converts a signal input through communication lines into a signal that allows itself to be processed on the PC card. The signal processing means converts the converted signal into video signals, and the PC interface means outputs the video signals into the information processing apparatus.

In a preferred seventh PC card in accordance with the present invention, the signal processing means of the above first through sixth PC cards comprises a data reading means that reads the image data of the images being displayed on the monitor screen of an information processing apparatus in which the PC card is installed and a superimposing means that superimposes the image data of an input signal on the image data of the displayed images. The data reading means reads the image data of the images being displayed on the monitor screen of the information processing apparatus, and the superimposing means superimposes the image data of an input signal on the read displayed image data.

An eighth PC card in accordance with the present invention is a PC card to be installed in an information processing apparatus and comprises a synchronizing signal source that outputs a synchronizing signal, frame buffer memory that stores pixel data to be displayed on the monitor screen, a graphic controller that converts the pixel data stored in the frame buffer memory into video signals in synchronization with the synchronizing signal, and an output means that outputs the video signals obtained by the graphic controller into the display controller of the information processing apparatus. The frame buffer memory stores pixel data for the information processing apparatus. The graphic controller converts the pixel data stored in the frame buffer memory into video signals and outputs into the display controller together with the synchronizing signal.

A ninth PC card in accordance with the present invention is a PC card to be installed in an information processing apparatus and comprises a PC interface means that reads video signals output from the information processing apparatus, a signal processing means that converts the read video signals into a signal of a different format, an external interface means that outputs the signal obtained by the signal processing means. Video signals output from the information processing apparatus are processed on the PC card, converted into a signal of a different format, and output to an external device.

A preferred tenth PC card in accordance with the present invention comprises a PC interface means that converts video signals output from an information processing apparatus into an analog signal, a signal processing means that converts the analog signal output from the PC interface means into a digital signal and compresses it, and an external interface means that outputs the signal obtained by the signal processing means. The PC interface means converts video signals output from the information processing apparatus into an analog signal. The signal processing means converts the analog signal into a compressed digital signal. The external interface means outputs the converted and compressed signal into an external device.

A preferred eleventh PC card in accordance with the present invention comprises a PC interface means that converts video signals input from an information processing apparatus into an analog signal, a signal processing means that converts the analog signal output from the PC interface means into a digital signal and compresses it, and an external interface means that converts the signal output from the signal processing means into a signal appropriate for a communication interface to output it onto communication lines. The PC interface means converts the video signals output from the information processing apparatus into an analog signal. The signal processing means converts the analog signal into a compressed digital signal. The external interface means converts the compressed digital signal into a signal appropriate for a communication interface of communication lines and outputs it into an external device.

A first PC card system in accordance with the present invention comprises the above first information processing apparatus and the above first PC card, and displays the images of video signals output from the first PC card on the monitor screen of the first information processing apparatus. The first PC card outputs video signals into the information processing apparatus, which displays the images of the video signals on the monitor screen.

A second PC card system in accordance with the present invention comprises the first information processing apparatus and a PC card selected from the above second and third PC cards. The images of an input signal selected from NTSC, S-VHS, and digital RGB signals are displayed on the monitor screen of the information processing apparatus. A signal input to the above third PC card and selected from NTSC, S-VHS, digital RGB signals is converted into video signals and output into the information processing apparatus. The information processing apparatus displays the images of the video signals on the monitor screen.

A third PC card system in accordance with the present invention comprises the first information processing apparatus and the fourth PC card and displays the images of compressed image data input to the fourth PC card on the monitor screen of the first information processing apparatus. Compressed image data input to the fourth PC card is restored and converted into an analog signal. The analog signal is converted into video signals and output to the information processing apparatus. The information processing apparatus displays the images of the video signals on the monitor screen.

A fourth PC card system in accordance with the present invention comprises the first information processing apparatus and the fifth PC card and receives a TV broadcast to display the broadcast images on the monitor screen of the fifth information processing apparatus. An RF signal input to the fifth PC card is converted into an NTSC signal, which is then converted into video signals and output into the information processing apparatus. The information apparatus then displays the images of the video signals on the monitor screen.

A fifth PC card system in accordance with the present invention comprises the first information processing apparatus and the sixth PC card and displays the images of compressed image data input through communication lines on the monitor screen of the information processing apparatus. Compressed image data input to the sixth PC card through communication lines is converted into video signals and output to the information processing apparatus, which displays the images of the video signals on the monitor screen.

A sixth PC card system in accordance with the present invention comprises the first information processing apparatus and the seventh PC card and superimposes image data input to or received by the PC card on the image data of the images being displayed on the information processing apparatus to display the superimposed images on the monitor screen of the information processing apparatus.

A seventh PC card system in accordance with the present invention comprises the first information processing apparatus and the eighth PC card and controls the monitor of the information processing apparatus. The eighth PC card controls the monitor by storing the pixel data of the information processing apparatus, converting the pixel data into video signals, and outputting them into the display controller.

An eighth PC card system in accordance with the present invention comprises the first information processing apparatus and the ninth PC card and processes video signals output from the information processing apparatus to output a processed signal into an external device through the PC card.

A ninth PC card system in accordance with the present invention comprises the first information processing apparatus and the tenth PC card and converts video signals output from the first information processing apparatus into compressed image data to output into an external device.

A tenth PC card system in accordance with the present invention comprises the first information processing apparatus and the eleventh PC card and converts video signals output from the first information processing apparatus into compressed image data to output onto communication lines.

An eleventh PC card system in accordance with the present invention comprises the fourth information processing apparatus, the first PC card, and the ninth PC card, and processes video signals output from the first PC card in the ninth PC card to output a processed signal into an external device.

A twelfth PC card system in accordance with the present invention comprises the fourth information processing apparatus, the second PC card, and the tenth PC card, converts an input signal selected from an NTSC signal and an S-VHS signal into video signals to display images thereof on the monitor screen, and converts the video signals into compressed image data to output into an external device.

A thirteenth PC card system in accordance with the present invention comprises the fourth information processing apparatus, the fifth PC card, and the tenth PC card, receives a TV broadcast to display images on the monitor screen, and converts the video signal of the TV broadcast into compressed image data to output into an external device.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiments according to the present invention will be described below with reference to the attached drawings.

Figure 1:
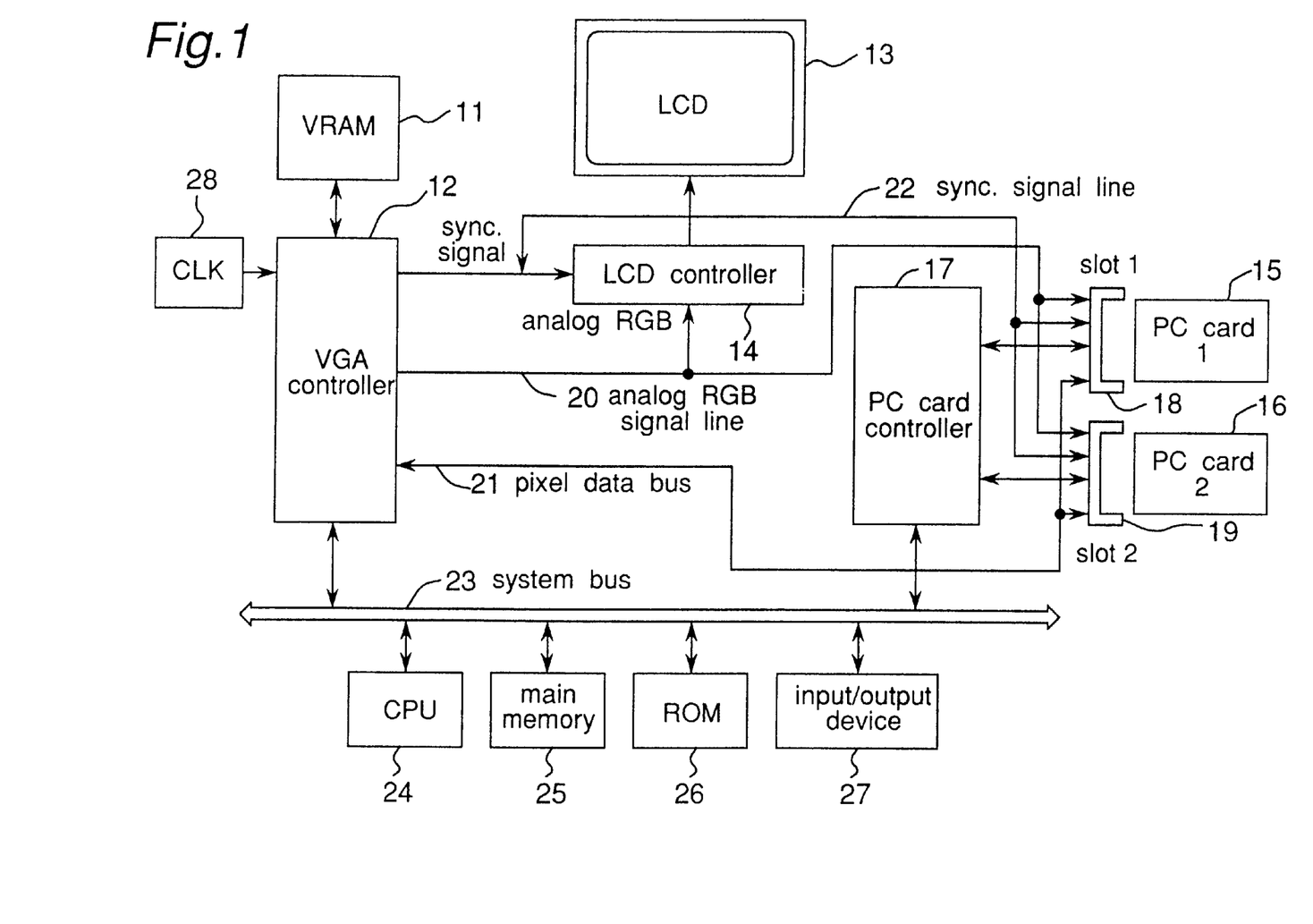
FIG. 1 is a block diagram illustrating the portable information processing system of a first embodiment in accordance with the present invention.

FIG. 1 is a block diagram illustrating the portable information processing system, abbreviated to PC hereafter, of a first embodiment in accordance with the present invention. The PC of the present embodiment comprises frame buffer memory 11 that stores image data, a VGA controller 12 that converts the image data stored in VGA controller 12 into analog RGB signals, an LCD controller 14 that controls a liquid crystal display 13, abbreviated to LCD hereafter, based on the analog RGB signals output from VGA controller 12, and a PC card controller 17 that controls installed PC cards. PC card controller 17 is connected to first and second PC card slots 18, 19 for installing first and second PC cards 15, 16. First and second PC card slots 18, 19 are connected to LCD controller 14 through analog RGB signal lines 20 for inputting and outputting analog RGB signals. PC card slots 18, 19 are also connected to VGA controller 12 through a pixel data bus 21 for passing the data stored in frame buffer memory 11. Further, PC card slots 18, 19 are connected to LCD controller 14 through synchronizing signal lines 22 for inputting and outputting a synchronizing signal. VGA controller 12 and PC card controller 17 are connected to a CPU 24, main memory 25, ROM 26, and input/output devices 27 through a system bus 23.

The operation of the PC of the present embodiment is described in the following. First PC card 15 and second PC card 16 are respectively installed in PC card slots 18 and 19 through connectors not illustrated in the figure. The first and second PC cards have functions described later for processing image data. When analog RGB signals and a synchronizing signal are input through one of first and second PC card slots 18, 19, they are input to LCD controller 14 respectively through analog RGB signal lines 20 and through synchronizing signal lines 22. LCD controller 14 converts the input analog RGB signals into a scanning signal in synchronization with the input synchronizing signal, so that images of the analog RGB signals are displayed on LCD 13. In this way, video signals input from a PC card is displayed on the LCD panel of the PC.

Further, VGA controller 12 of the PC reads image data stored in frame buffer memory 11 to output to PC card slots 18, 19 through pixel data bus 21. VGA controller 12 also outputs analog RGB signals to PC card slots 18, 19 through RGB signal lines 20. Consequently, the image data is output to installed PC cards 15, 16. Therefore, PC cards 15, 16 can read and process image data of the images being displayed on the LCD panel.

In the present embodiment, the size and shape of the PC card slots and PC cards are those conforming to a standard such as JEIDA. Therefore, the terminals for passing video signals are not newly created, but the functions of terminals are switched by software so that connectors of a prior standard can be used. Consequently, in addition to the PC cards of the present invention, PC cards conforming to a prior standard can also be used in the PC of the present invention.

The PC card system of the present embodiment displays the images of video signals input from a PC card through a PC card slot on the LCD panel of the PC. Therefore, various applications are possible depending on the features of the PC card for processing the video signals. Embodiments of PC cards having some of the features for processing video signals are described in the following.

Figure 2:
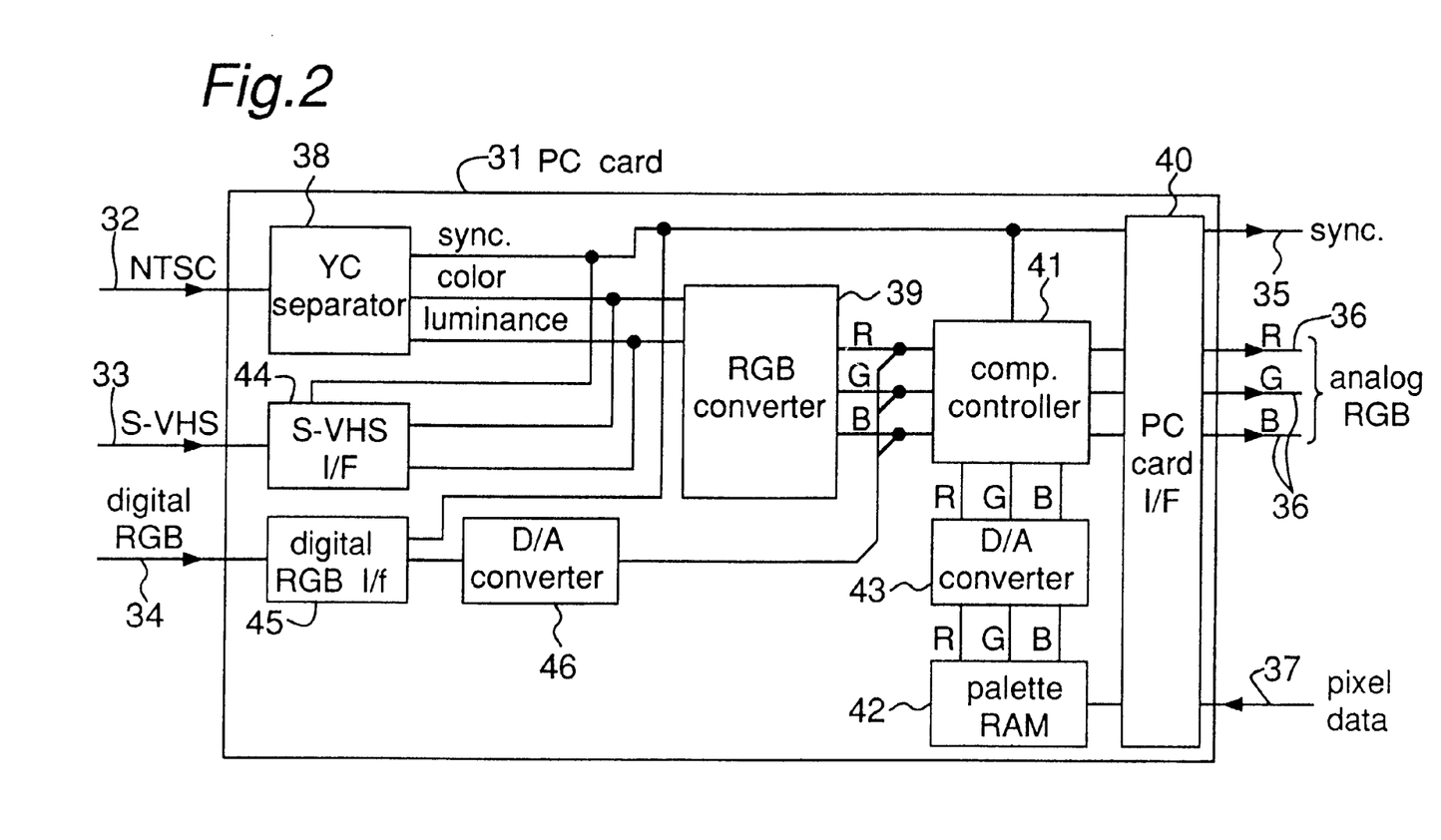
FIG. 2 is a block diagram illustrating the PC card of a second embodiment in accordance with the present invention for converting NTSC, S-VHS, and digital RGB signals into video signals.

FIG. 2 is a block diagram illustrating the PC card of a second embodiment. The PC card of the present embodiment converts NTSC, S-VHS, and digital RGB signals into video signals.

In a PC card 31 of the present embodiment, an NTSC terminal 32 for inputting an NTSC signal input from the outside is connected to a YC separation circuit 38 for separating the NTSC signal into a synchronizing signal, a chroma signal, and a luminance signal. YC separation circuit 38 is connected to an RGB conversion circuit 39 that converts the chroma and luminance signals into analog RGB signals. YC separation circuit 38 is also connected to a PC card interface 40 that outputs the synchronizing signal into the PC. RGB conversion circuit 39 is connected to compositing control circuit 41 that composites the image data of the input signal and the image data of the images being displayed on the LCD panel of the information processing apparatus.

An S-VHS terminal 33 for inputting and outputting a video signal of the S-VHS standard to and from the outside is connected to an S-VHS interface 44 that separates the input S-VHS signal into a synchronizing signal, a chroma signal, and a luminance signal. S-VHS interface 44 is connected to RGB conversion circuit 39 and also to PC card interface 40 for passing the synchronizing signal.

A digital RGB terminal 34 for inputting and outputting a digital RGB signal to and from the outside is connected to a digital RGB interface 45 that converts the digital RGB signal into a signal of a format appropriate for the PC card. Digital RGB interface 45 is connected to a digital-to-analog converter 46 that converts the digital RGB signal into analog RGB signals. Digital-to-analog converter 46 is connected to compositing control circuit 41.

Compositing control circuit 41 is connected to PC card interface 40 for passing the analog RGB signals to and from the PC, and also connected to a digital-to-analog converter 43 that converts the image data of the images being displayed on the LCD panel of the PC into analog signals. Digital-to-analog converter 43 is connected to palette RAM 42 that stores the image data of the images being displayed on the LCD panel of the PC. RAM 42 is also connected to PC card interface 40. Digital-to-analog converter 43 is also connected to compositing control circuit 41 to convert the image data stored in palette RAM 42 into analog signals to output the converted analog signals. PC card interface 40 is connected to a sync terminal 35 for passing a synchronizing signal to and from the PC, to an analog RGB terminal 36 for passing analog RGB signals, and to a pixel data terminal 37 for inputting image data. These terminals are formed on the connector portion of the PC card to be installed in one of the PC card slots.

The operation of the PC card of the present embodiment is described in the following. When an NTSC video signal is input from an external device through NTSC terminal 32, the NTSC video signal is separated into a synchronizing signal, a chroma signal, and a luminance signal. The synchronizing signal is output into LCD controller 14 of the PC through PC card interface 40 and sync terminal 35. The chroma and luminance signals are converted into RGB signals by RGB conversion circuit 39 and output into compositing control circuit 41. Compositing control circuit 41 outputs into PC card interface 40 the signals output from RGB conversion circuit 39 as they are when it does not perform compositing with the image data of the images being displayed on the LCD panel of the PC. When it performs compositing, VGA controller 12 of the PC reads image data stored in frame buffer memory 11 through pixel data bus 21. The read image data is stored in palette RAM 42 of the PC card through pixel data terminal and PC card interface 40. The image data stored in palette RAM 42 is converted into analog RGB signals by digital-to-analog converter 43 and composited by compositing control circuit 41 with the converted RGB signals obtained from the outside video signal. The composited RGB signals are output into the PC through PC card interface 40 and analog RGB terminal 36.

When an S-VHS signal is input through S-VHS terminal 33 from an external device, the S-VHS signal is separated into a synchronizing signal, a chroma signal, and a luminance signal by S-VHS interface 44. The synchronizing signal is output into LCD controller 14 of the PC through PC card interface 40 and sync terminal 35. The chroma and luminance signals are converted into RGB signals by RGB conversion circuit 39 and output into compositing control circuit 41. As described above, compositing control circuit 41 performs on request the compositing of the input video signal and the image data of the images being displayed on the LCD panel of the PC, and the composited RGB signals are output into the PC.

When a digital RGB signal is input through digital RGB terminal 34, it is input to digital-to analog converter 46 through digital RGB interface 45. A synchronizing signal is output from digital RGB interface 45 into LCD controller 14 of the PC through PC card interface 40. The digital RGB signal is converted into analog RGB signals by digital-to analog converter 46 and output into compositing control circuit 41. As described above, compositing control circuit 41 performs on request the compositing of the input video signal and the image data of the images being displayed on the LCD panel of the PC, and the composited RGB signals are output into PC.

When a synchronizing signal and analog RGB signals are output to the PC by PC cards 15, 16 through PC card slots 18, 19 as described above, the synchronizing signal and analog RGB signals are output into LCD controller 14 respectively synchronizing signal lines and through analog signal lines. These signals are converted into a scanning signal by LCD controller 14 and output into LCD 13, which displays images.

As described above, the PC card system of the present embodiment can display images of an NTSC signal, an S-VHS signal, a digital RGB signal, and the like on the LCD panel of the PC. Further, the PC card system can composite the image data of the images being displayed on the LCD panel of the PC and the image data being input from the outside, so that input images can be displayed on a part of the image area displayed by the PC.

Figure 3:
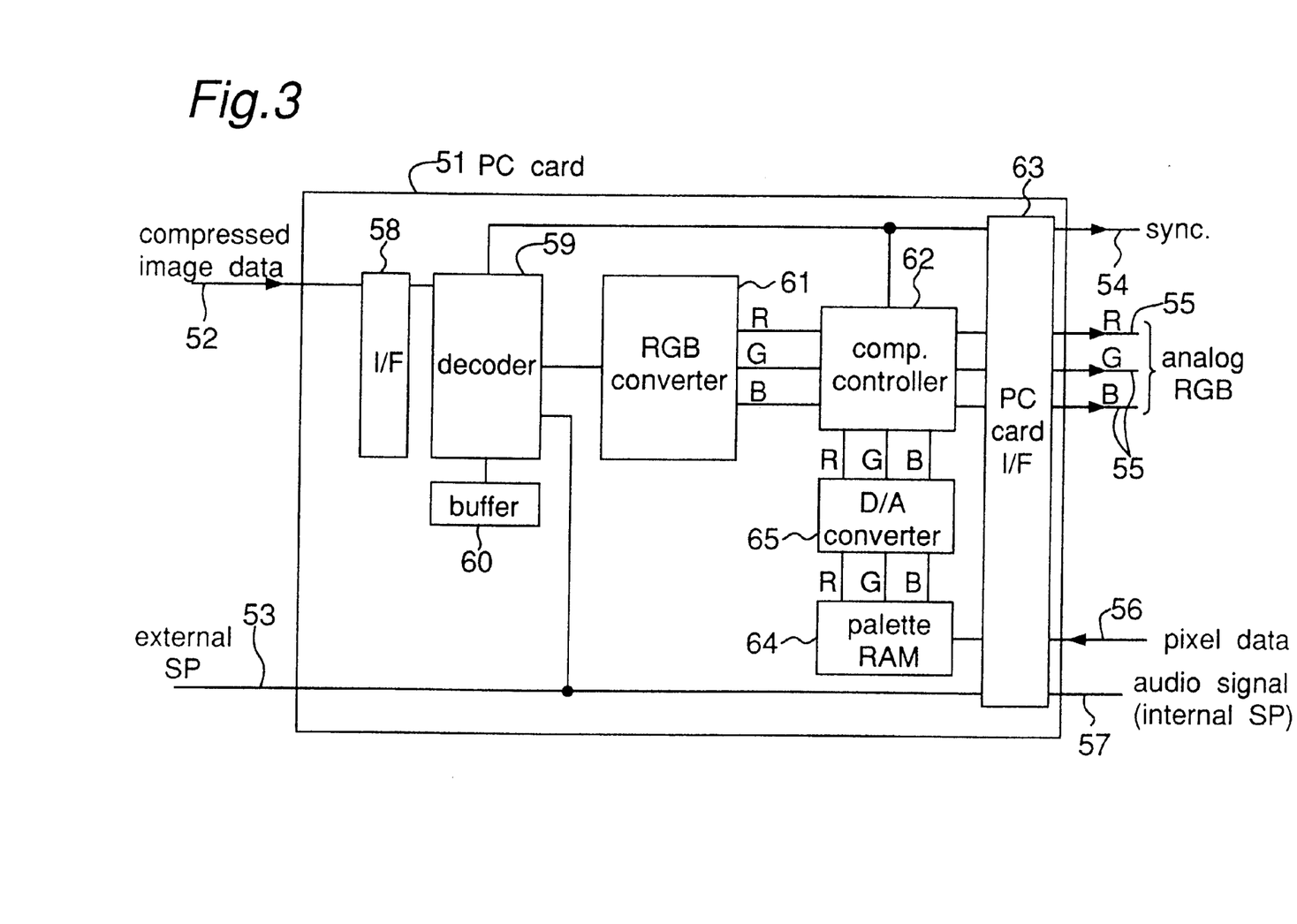
FIG. 3 is a block diagram illustrating the PC card of a third embodiment in accordance with the present invention for converting compressed digital image data into video signals.

FIG. 3 is a block diagram illustrating the PC card of a third embodiment in accordance with the present invention. A PC card 51 of the present embodiment has a function to composite input compressed image data in one of the MPEG1, MPEG2, H.261 of ITU-T formats, and the like and the image data of the images being displayed on the LCD panel of the PC to display the composited images on the LCD panel of the PC.

In PC card 51, a compressed image data terminal 52 for inputting compressed image data input from the outside is connected to an interface 58 that converts the input signal into a signal of a format appropriate for the PC card. Interface 58, which performs data compression, is connected to a decoder circuit 59 that converts an analog signal into a digital signal. Decoder 59 is connected to a buffer 60 for a work area and also connected to an RGB conversion circuit 61 that converts the signal output from decoder 59 into analog RGB signals. RGB conversion circuit 61 is connected to a compositing control circuit 62 that composites images on the LCD panel and input images. Compositing control circuit 62 is connected to a PC card interface 63 for passing RGB signals to and from the PC and also connected to a digital to analog converter 65 that converts image data of the images on the LCD panel of the PC into analog signals. Digital-to analog converter 65 is connected to palette RAM 64 that stores image data of the images on the LCD panel of the PC. Palette RAM 64 is connected to PC card interface 63. Further, decoder circuit 59 and compositing control circuit 62 are connected to PC card interface 63 for inputting and outputting a synchronizing signal. PC card interface 63 is connected to a sync terminal 54 for passing a synchronizing signal, connected to an analog RGB terminal 55 for passing analog RGB signals, and connected to a pixel data terminal 56 for passing image data. These terminals are formed on the connector portion of the PC card and applied to a PC card slot.

The operation of the PC card of the present embodiment is described in the following in the case where input compressed data and the image data of the images being displayed on the LCD panel are composited and displayed on the LCD panel.

Compressed image data input to interface 58 through compressed image data terminal 52 is input to decoder circuit 59, which decompresses the image data and converts into an analog signal. The converted analog signal is converted into RGB signals by RGB conversion circuit 61 and output into compositing control circuit 62. Compositing control circuit 62 outputs into PC card interface 63 the converted RGB signals as they are, when it does not perform compositing with the image data of the images being displayed on the LCD panel of the PC. When it performs the compositing, it reads image data stored in frame buffer memory 11 through pixel data bus 21. The read image data is stored in palette RAM 64. The image data stored in palette RAM 64 is converted into analog RGB signals by digital-to-analog converter 65 and input to compositing control circuit 62. Compositing control circuit 62 composites the analog RGB signals obtained from the compressed image data input from the outside and the analog RGB signals obtained from the image data of the LCD panel of the PC. The resulting composite signals are output into PC card interface 63. These signals are output into the PC through analog RGB terminal 55 and a PC card slot. The RGB signals input to the PC are input to LCD controller 14 through analog RGB signal lines, and the images of the RGB signals are displayed on LCD 13.

The PC card system of the present embodiment can composite the image data of the LCD panel of the PC and compressed image data input from the outside, so that images input from the outside can be displayed on a part of the image area displayed by the PC.

Figure 4:
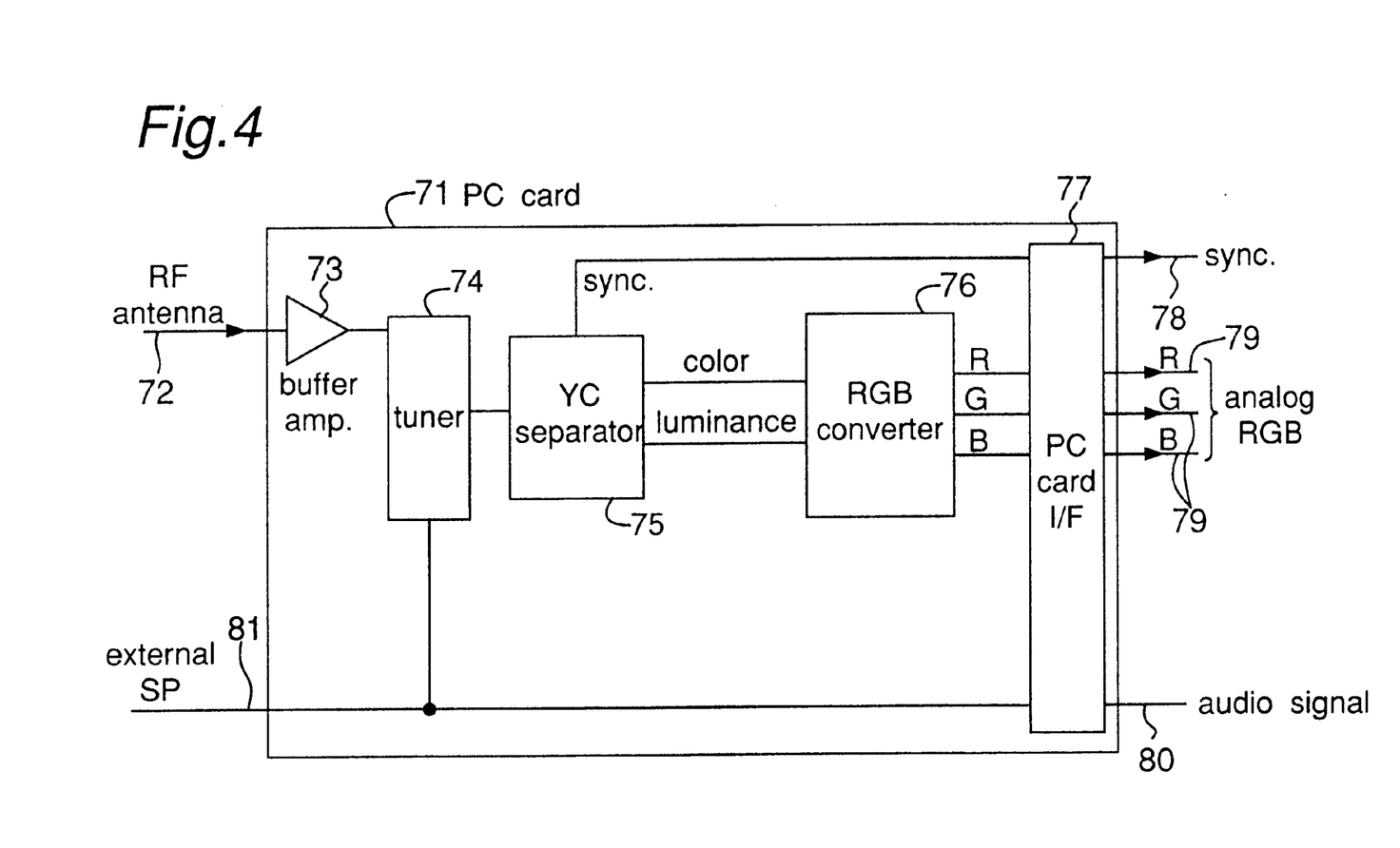
FIG. 4 is a block diagram illustrating the PC card of a fourth embodiment having a TV tuner in accordance with the present invention.

FIG. 4 is a block diagram illustrating the PC card of a fourth embodiment having a TV tuner in accordance with the present invention.

In a PC card 71, an RF antenna terminal 72 for inputting an RF signal from an external antenna for receiving a TV broadcast is connected to a buffer amplifier 73 for amplifying RF signals. Buffer amplifier 73 is connected to a tuner circuit 74 for selecting a broadcast station from the amplified signal to convert it into an NTSC signal. Tuner circuit 74 is connected to a YC separation circuit 75 for separating the NTSC signal output from tuner circuit 74 into a synchronizing signal, a chroma signal, and a luminance signal. YC separation circuit 75 is connected to an analog RGB conversion circuit 76 that converts the chroma and luminance signals output from YC separation circuit 75 into analog RGB signals and also connected to a PC card interface 77 that passes the synchronizing signal to and from the PC. RGB conversion circuit 76 is connected to PC card interface 77 for outputting the analog RGB signals into the PC. PC card interface 77 is connected to a synchronizing signal terminal 78 for passing the synchronizing signal to and from the PC and also connected to an analog RGB terminal 79 for passing the analog RGB signals. These terminals are formed on the connector portion of the PC card and applied to a PC card slot.

The operation of the PC card of the present embodiment that receives a TV broadcast is described in the following.

An RF signal input through RF antenna terminal 72 is amplified by buffer amplifier 73 and input to tuner circuit 74. A signal selected by tuner circuit 74 is converted into an NTSC signal, input to YC separation circuit 75, and separated thereby into a chroma signal, a luminance signal, and a synchronizing signal. The synchronizing signal is output to the PC through PC card interface 77 and sync terminal 78. The chroma and luminance signals are input to RGB conversion circuit 76, converted into RGB signals, and output to the PC through PC card interface 77 and analog RGB terminal 79. The RGB signals input to the PC are input to LCD controller 14 through analog RGB signal lines 20 and displayed on LCD 13.

The PC card system of the present embodiment can receive a TV broadcast by a potable PC to display images on the LCD panel. Further, as described above, the PC card system can composite the image data of the images on the LCD panel of the PC and broad cast TV image data, so that it can display images of a TV broadcast on a part of the image area displayed by the PC.

Figure 5:
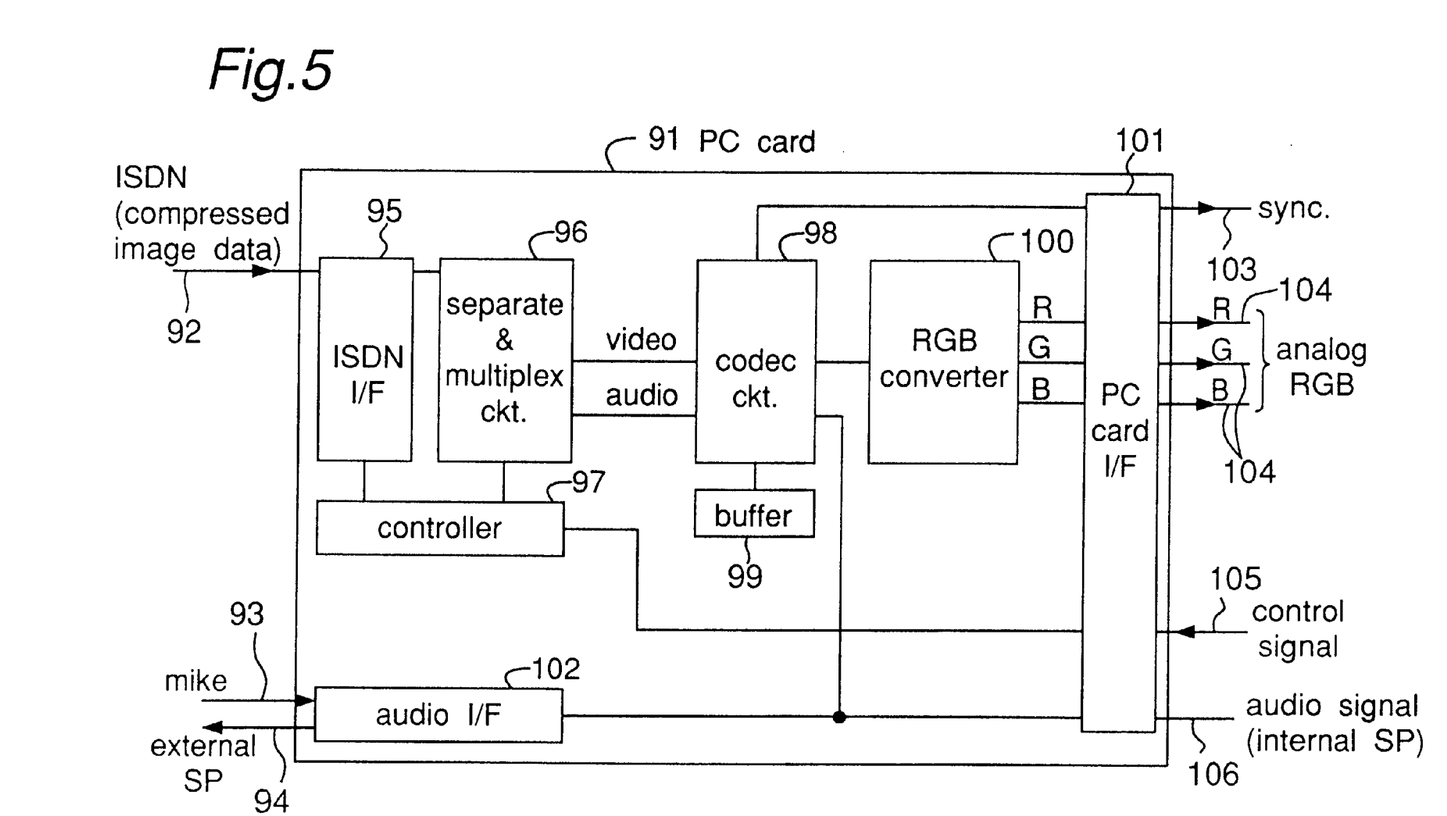
FIG. 5 is a block diagram illustrating the PC card of a fifth embodiment in accordance with the present invention for converting compressed image data input through communication lines into video signals

FIG. 5 is a block diagram illustrating the PC card of a fifth embodiment having communication functions of transmitting image data.

In a PC card 91 of the present embodiment, an ISDN interface 95 that converts an ISDN signal into a signal of a format that allows itself to be processed on the PC card is connected to separation and multiplexing circuit 96. Separation and multiplexing circuit 96 separates the output signal of ISDN interface 95 into a video and an audio signal, and conversely multiplexes a video signal and an audio signal. A controller 97 is connected to both ISDN interface 95 and separation and multiplexing circuit 96 to control them. Controller 97 is also connected to a PC card interface 101 to receive a control signal from the PC. Separation and multiplexing circuit 96 is connected to a codec circuit 98 that performs the coding and decoding of video and audio signals and also conversion between analog and digital signals. Codec circuit 98 is connected to an RGB conversion circuit 100 that converts an analog video signal into analog RGB signals and vice versa. Codec circuit 98 is also connected to PC card interface 101 to output a synchronizing signal. PC card interface 101 is connected to a sync terminal 103 for outputting the synchronizing signal, to an analog RGB terminal 104 for outputting and inputting analog RGB signals, and to a control terminal 105 for receiving the control signal from the PC. These terminals are formed on the connector portion of the PC card and applied to the PC card slot.

The operation of the PC card of the present embodiment in the case where the PC displays the images of compressed image data received by the PC card through ISDN lines.

A signal input through the ISDN lines and ISDN terminal 92 is converted by ISDN interface 92 into a signal of a format that allows itself to be processed on the PC card. The converted signal output from ISDN interface 95 is input to separation and multiplexing circuit 96 and separated thereby into a video signal, an audio signal, and a data signal, which are input to codec circuit 98. The video signal is decoded and converted into an analog signal by codec circuit 98. The analog signal is converted into analog RGB signals by RGB conversion circuit 100 and output into PC card interface 101. The analog RGB signals are output from PC card interface 101 into the PC through analog RGB terminal 104 and one of the PC card slots 18, 19.

Next, the operation of the PC card of the present embodiment in the case where images displayed by the PC are transmitted as compressed image data over ISDN lines is described in the following.

Analog RGB signals output from the PC through analog RGB signal lines are applied to analog RGB terminal 104 through a PC card slot. The input analog RGB signals are input to RGB conversion circuit 100 through PC card interface 101. The analog RGB signals are converted into an analog video signal by RGB conversion circuit 100 and output into codec circuit 98. The analog video signal is converted into a digital signal and compressed by codec circuit 98. The compressed digital signal is multiplexed with other signals by separation and multiplexing circuit 96 and output into ISDN interface 95. The multiplexed signal is converted by ISDN interface 95 into a signal appropriate for an ISDN interface and transmitted through ISDN terminal 92 and over the ISDN lines.

As described above, the PC card of the present embodiment can display the images of compressed image data received through ISDN lines on the LCD panel of the PC, and image data displayed on the LCD panel of the PC can be compressed and transmitted over ISDN lines.

Figure 6:
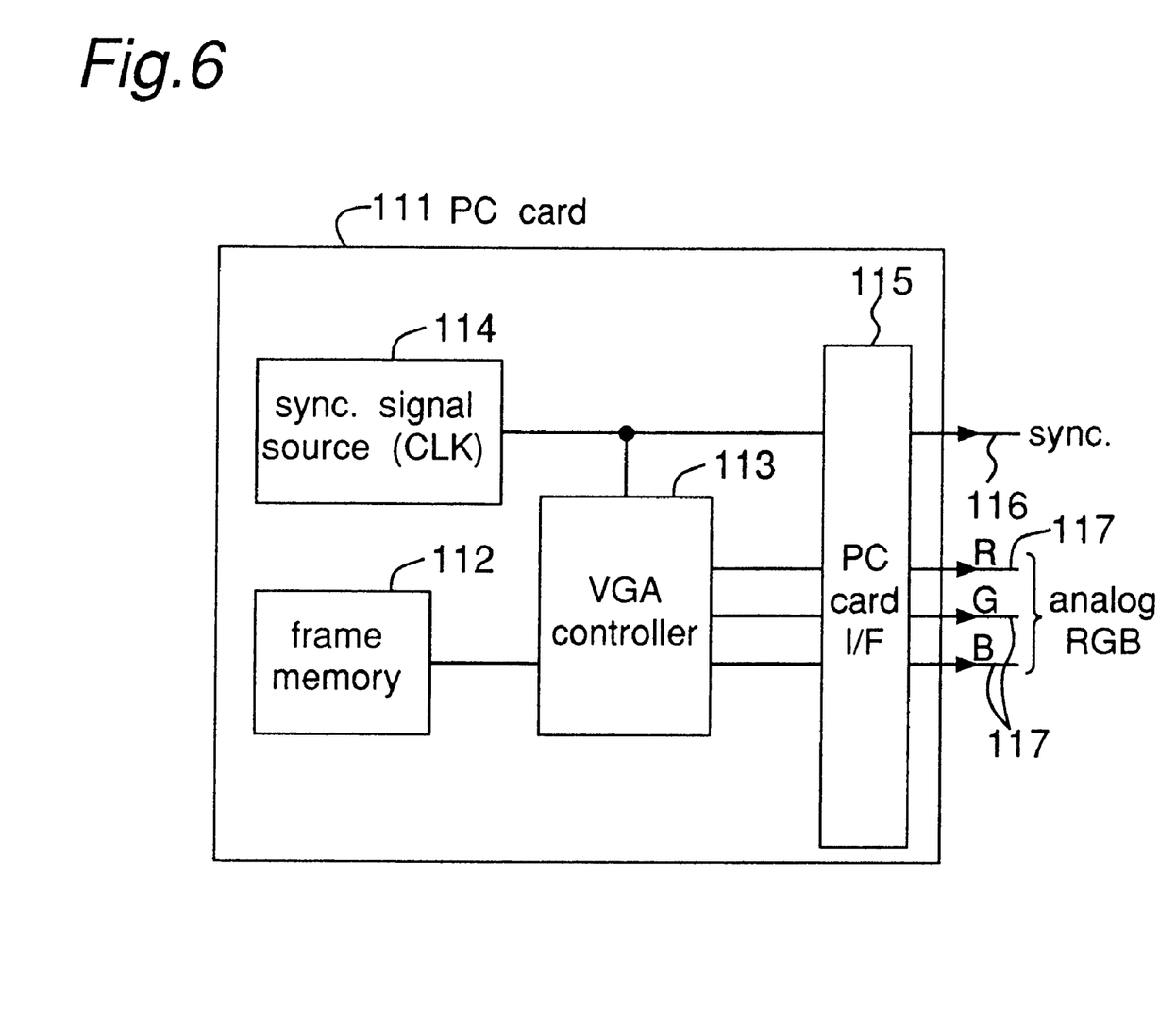
FIG. 6 is a block diagram illustrating the PC card of a sixth embodiment having LCD control functions in accordance with the present invention.

FIG. 6 is a block diagram illustrating the PC card of a sixth embodiment having LCD control functions in accordance with the present invention.

A PC card 111 comprises frame buffer memory 112 that stores image data, a VGA controller 113 that performs conversion into RGB signals and the like in reading and writing image data stored in frame buffer memory 112, a synchronizing signal source 114 that generates a synchronizing signal, a PC card interface 115 that passes the synchronizing signal, analog RGB signals, and the like to and from the PC through PC card slots, a sync terminal for outputting the synchronizing signal, and an analog RGB terminal 117 for outputting the analog RGB signals. Here, frame buffer memory 112, VGA controller 113, and synchronizing signal source 114 have respectively the same functions and constructions as the PC frame memory 11, VGA controller 12, and synchronizing signal source 28 in FIG. 1.

The operation of the PC card of the present embodiment for LCD control is described in the following.

When the PC displays images on LCD 13, synchronizing signal source 114 on the PC card outputs a synchronizing signal into the PC, and VGA controller 113 converts the image data of the images in frame buffer memory 112 into analog RGB signals. The converted analog RGB signals are output into LCD controller 14 of the PC through PC card interface 115 and the PC card slot, and the images of the converted RGB signals are displayed on LCD 13. VGA controller 113 and frame buffer memory 112 reside on the PC card, so that the LCD of the PC can be controlled from the PC card. The PC itself can be relieved of this function by this means, so that the functions of controlling the LCD can be separated from the PC.

Various PC cards having the functions of controlling the LCD with different processing speeds, resolutions, and the number of colors can be supplied by the above construction and operation, so that users can select a PC card depending on their needs. Further, the separation of LCD control from the PC contributes to the simplification of PC constructions and cuts of production costs. Further, the functional extension of the display portion and upgrading to higher performance can be obtained by changing the PC card to a one of higher performance, so that the extendability of the information processing system increases.

In FIG. 1, both first and second PC card slots 18, 19 are connected to analog RGB signal lines 20 and synchronizing signal lines 22, so that the analog RGB signals and synchronizing signal can be passed between first PC card slot 18 and second PC card slot 19, that is, image data can be transferred between the first PC card and the second PC card.

Figure 7:
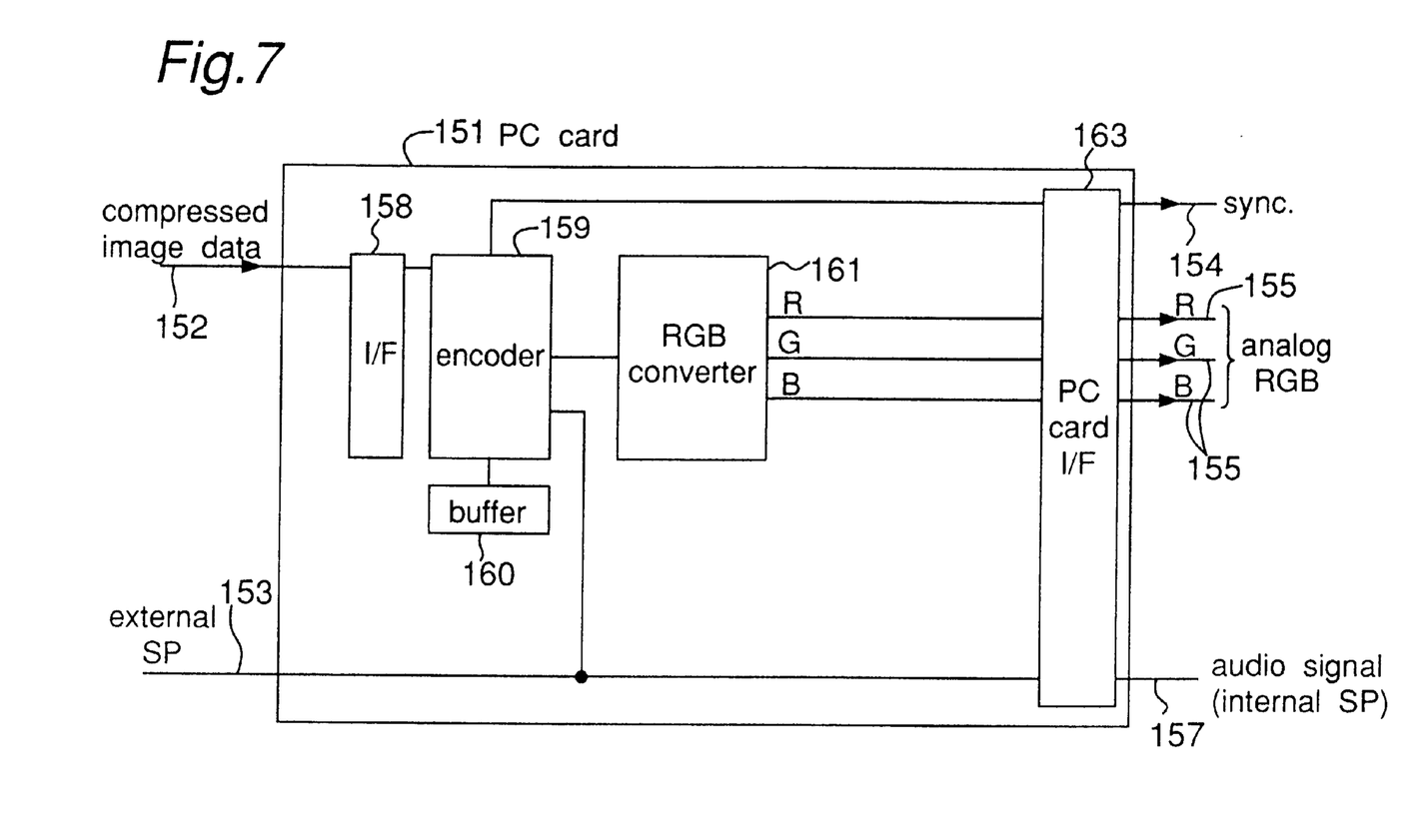
FIG. 7 is a block diagram of the PC card of a seventh embodiment in accordance with the present invention for converting video signals output from a portable information processing apparatus into compressed image data.

FIG. 7 is a block diagram of the PC card of a seventh embodiment in accordance with the present invention for converting analog RGB signals input from the PC into compressed image data to output.

The PC card 151 has an analog RGB terminal 155 for inputting analog RGB signals input from the PC, a sync terminal 154 for inputting a synchronizing signal. These terminals are connected to a PC card interface 163, which is connected to an RGB conversion circuit 161 that converts the analog RGB signals into an analog video signal. PC card interface 163 is connected to an encoder circuit 159 that converts the analog video signal into a compressed digital signal. Encoder circuit 159 is connected to a buffer 160 for a work area and also connected to an interface 158 that converts the compressed digital signal into a signal appropriate for output. Interface 158 is connected to a compressed image data terminal 152 for outputting the compressed image data.

In PC card 151, analog RGB signals input through analog RGB terminal 155 are input to RGB conversion circuit 161 through PC card interface 163. The input analog RGB signals are converted into an analog video signal by RGB conversion circuit 161 and output into encoder 159. Encoder 159 converts the analog video signal into a digital signal, compress it, and output through interface 158 and compressed image data terminal 152. In this way, the analog RGB signals input from the PC are converted into compressed image data and output to an external device.

In the PC of FIG. 1, install the PC card 31 of FIG. 2 in the first PC card slot 18 as the first PC card 15, and install the PC card 151 in the second PC card slot 18 as the second PC card 16. Then the first PC card 15 can composite one of the NTSC, S-VHS, and digital RGB signals and the like with the video signals of the images being displayed on the LCD panel of the PC to display the composited images on the LCD panel of the PC. At the same time, the PC can output the composited video signals into second PC card 16, which converts the composited image signals into compressed image data to output into an external device.

In this way, using various combinations of the PC cards of the above embodiments, a number of applications can be obtained, such as compositing an S-VHS signal input from the outside and the video signals of the images being displayed on the LCD panel of the PC to output the compressed composited image data onto communication lines and receiving broadcast images by the tuner and converting them into an S-VHS signal to output.

According to the present invention, the information processing systems of the above embodiments create a signal path between the PC card slots 18, 19 on one side and the LCD controller 14 and VGA controller 12 on the other side for transferring signals. Consequently, the images of video signals input from the PC cards 15, 16 can be displayed on the LCD 13 of the PC. Therefore, the PC cards are not limited to the above embodiments, so far as PC cards have functions to output video signals to the PC.

In an information processing apparatus of the present invention, a signal path is created between the display controller and the PC card slots for transferring the synchronizing and video signals, so that the synchronizing and video signals can be passed between a PC card and the display controller, and consequently, control over the PC monitor can be made by the PC card.

In an information processing apparatus of the present invention, video signal terminals and sync terminals are formed in the PC card slots, and video signal lines and synchronizing signal lines are formed between the terminals and the display controller, so that the synchronizing and video signals are transferred between the installed PC cards and the display controller, and consequently, control over the PC monitor can be made by the PC cards.

In an information processing apparatus of the present invention, pixel data terminals are formed in the PC card slots, and a pixel data bus is formed between the pixel data terminals and the graphic controller, so that pixel data can be transferred between the installed PC cards and the graphic controller; particularly, the image data of the information processing system can be output to the PC cards.

An information processing apparatus of the present invention has a means comprising synchronizing signal lines and video signal lines for transferring video and synchronizing signals input from a first PC card slot to a second PC card slot. The video and synchronizing signals can be transferred from a first PC card to a second PC card by this means.

A PC card of the present invention comprises an external interface means that inputs a signal from the outside, a signal processing means that converts the input signal into video signals, and a PC interface means that outputs the video signals. Processing of video signals in a PC card is made possible by these means.

A PC card system of the present invention can convert an input signal selected from an NTSC signal and an S-VHS signal into video signals to output into an information processing apparatus.

A PC card of the present invention can convert an input digital RGB signal into video signals to output into an information processing apparatus.

A PC card of the present invention can convert an input compressed image data signal into video signals to output into an information processing apparatus.

A PC card of the present invention can convert an input RF signal into video signals to output into an information processing apparatus.

A PC card of the present invention can convert a signal input through communication lines into video signals to output into an information processing apparatus.

A PC card of the present invention can read the image data of the images being displayed on the monitor screen of the information processing system in which the PC card is installed, and can superimpose an image data of an input signal on the read image data of the screen.

A PC card of the present invention can control the monitor of an information processing apparatus. Consequently, the display control part of the information processing apparatus can be removed, and production costs of the information processing apparatus can be cut down. Further, upgrading to higher performance can be easily obtained by reassigning the display control functions to PC cards.

A PC card of the present invention can process video signals input from an information processing apparatus to convert into a signal of a desired format and output into an external device.

A PC card of the present invention can convert video signals input from an information processing apparatus into compressed image data to output into an external device.

A PC card of the present invention can convert video signals input from an information processing apparatus into compressed image data to output onto communication lines.

According to a PC card system of the present invention, an information processing apparatus can display the images of video signals input from a PC card on the PC monitor.

According to a PC card system of the present invention, an information processing apparatus can display on its monitor screen the images of a video signal selected from NTSC, S-VHS, and digital RGB signals.

According to a PC card system of the present invention, an information processing apparatus can display the images of input compressed image data on the monitor screen.

According to a PC card system of the present invention, an information processing apparatus can receive a TV broadcast and display its images on the monitor screen.

According to a PC card system of the present invention, an information processing apparatus can input a video signal transmitted over communication lines to display its images on the monitor screen.

According to a PC card system of the present invention, an information processing apparatus can superimpose input or received image data on the image data of the images being displayed on the monitor screen to display the composited images on the screen.

According to a PC card system of the present invention, the display control part of an information processing apparatus is built on a PC card to raise the extendability of display control functions.

According to a PC card system of the present invention, video signals output from its information processing apparatus can be converted into a signal of a desired format and output into an external device.

According to a PC card system of the present invention, video signals output from its information processing apparatus can be converted into compressed image data and output into an external device.

According to a PC card system of the present invention, video signals output from its information processing apparatus can be converted into compressed image data and transmitted over communication lines.

According to a PC card system of the present invention, a second PC card installed in a second PC card slot of its information processing apparatus can process video signals output from a first PC card installed in a first PC card slot and can output the resulting signal into an external device.

According to a PC card system of the present invention, its information processing apparatus can convert a signal selected from NTSC and S-VHS signals into video signals to display images of the video signals on the monitor screen as well as to output the video signals into an external device.

According to a PC card system of the present invention, its information processing apparatus can receive a TV broadcast, display its images on the monitor screen, and output the video signals of the TV broad cast into an external device.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An information processing apparatus comprising:
   a built-in monitor that displays images,
   a frame buffer memory that stores pixel data displayed on a screen of said built-in monitor;
   a graphic controller that converts the pixel data stored in said frame buffer memory into analog video signals;
   a display controller that controls said built-in monitor based on the analog video signals from said graphic controller;
   at least one PC card slot for receiving a PC card therein;
   a PC card controller that controls the PC card received in the PC card slot;
   a system bus between said graphic controller and said PC card controller; and
   a video signal path that directly connects between said display controller and said at least PC card slot;
      whereby video signals are directly transmitted from said PC card to said display controller to display images on said built-in monitor.

2. The information processing apparatus of claim 1, wherein said at least one PC card slot has a video terminal for inputting and outputting video signals to and from said display controller and a sync terminal for inputting and outputting a synchronizing signal to and from said display controller, and the signal path includes a video signal line that connects an input/output of said display controller to said video terminal of said at least one PC card slot and a synchronizing signal line that connects the input/output terminal of said display controller to said sync terminal of said PC card slot.

3. The information processing apparatus of claim 2, wherein said at least one PC card slot further includes a pixel data terminal for passing the pixel data between an installed PC card and said graphic controller, and the signal path includes a pixel data bus for connecting the input/output terminal of said graphic controller to said pixel data terminal of said at least one PC card slot.

4. The information processing apparatus of claim 1, wherein said at least one PC card slot includes first and second PC card slots, and said information processing apparatus further comprises output means that outputs video and synchronizing signals input from a PC card inserted into said first PC card slot into a PC card inserted into said second PC card slot.

5. A PC card system including an information processing apparatus and a PC card, said information processing apparatus including,
- a built-in monitor that displays images;
- a frame buffer memory that stores pixel data displayed on a screen of said built-in monitor;
- a graphic controller that converts the pixel data stored in said frame buffer memory into video signals,
- a display controller that controls said built-in monitor based on the video signals from said graphic controller, and
- at least one PC card slot for receiving said PC card therein and passing data to and from said PC card;

said information processing apparatus having a signal path formed between said display controller and said at least one PC card slot to output and input a synchronizing signal and video signals for controlling said built-in monitor, and said PC card to be inserted into said at least one PC card slot;

said PC card system comprising:
- external interface means that inputs an external signal from the outside;
- signal processing means that processes the input signal to convert into video signals of a desired format; and
- PC interface means that outputs the video signals obtained by said signal processing means into said information apparatus through said PC card slot and the signal path.

* * * * *